United States Patent
Li et al.

(10) Patent No.: US 9,973,513 B2
(45) Date of Patent: May 15, 2018

(54) METHOD AND APPARATUS FOR COMMUNICATION NUMBER UPDATE

(71) Applicant: TENCENT TECHNOLOGY (SHENZHEN) COMPANY LIMITED, Shenzhen (CN)

(72) Inventors: Yanchao Li, Shenzhen (CN); Lingling Xiao, Shenzhen (CN); Zhongcheng Li, Shenzhen (CN); Yalong Zhang, Shenzhen (CN); Yun Zhao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 176 days.

(21) Appl. No.: 15/171,050

(22) Filed: Jun. 2, 2016

(65) Prior Publication Data

US 2016/0277417 A1    Sep. 22, 2016

Related U.S. Application Data

(63) Continuation of application No. PCT/CN2014/093406, filed on Dec. 9, 2014.

(30) Foreign Application Priority Data

Dec. 10, 2013 (CN) .......................... 2013 1 0670173

(51) Int. Cl.
*H04L 29/06* (2006.01)
*H04L 12/58* (2006.01)

(52) U.S. Cl.
CPC ............ *H04L 63/102* (2013.01); *H04L 51/28* (2013.01); *H04L 63/083* (2013.01); *H04L 63/1416* (2013.01)

(58) Field of Classification Search
CPC ..... H04L 63/102; H04L 51/28; H04L 63/083; H04L 63/1416
See application file for complete search history.

(56) References Cited

U.S. PATENT DOCUMENTS

| | | | |
|---|---|---|---|
| 8,396,877 B2* | 3/2013 | Paulk ............... | G06F 17/30303 707/749 |
| 2006/0069727 A1* | 3/2006 | Fuller ..................... | H04L 51/04 709/206 |
| 2009/0248799 A1* | 10/2009 | Gavita .................... | H04L 51/04 709/204 |
| 2009/0280786 A1* | 11/2009 | Ziklik ............... | H04M 3/42059 455/415 |
| 2011/0106857 A1* | 5/2011 | Besombe ............... | G06Q 10/10 707/803 |
| 2012/0004015 A1* | 1/2012 | Le Thierry D'Ennequin ... | H04M 1/274516 455/566 |

* cited by examiner

*Primary Examiner* — Oleg Korsak
(74) *Attorney, Agent, or Firm* — Anova Law Group, PLLC (57) ABSTRACT

A communication number updating method is provided. The method includes obtaining an old communication number and a new communication number used by a same user account of an instant messenger for a user of the old communication number and the new communication number, generating a communication number change message which carries the old communication number and the new communication number, sending the communication number change message to a contact of the user account through the instant messenger, so that the instant messenger logged in by the contact of the user account automatically accesses a local address book and add the new communication number in a communication entry of the old communication number in the local address book.

16 Claims, 6 Drawing Sheets

METHOD AND APPARATUS FOR COMMUNICATION NUMBER UPDATE

CROSS-REFERENCES TO RELATED APPLICATIONS

This application is a continuation of PCT/CN2014/093406 filed on Dec. 9, 2014, which claims priority of Chinese Patent Application No. 201310670173.X, filed on Dec. 10, 2013. The entire content of the two applications are incorporated by reference herein.

FIELD OF THE INVENTION

The present invention generally relates to the field of communication technology and, more particularly, to a communication number updating method and apparatus.

BACKGROUND

Due to the change of residence or communication service providers and other reasons, it appears more often that a user changes his/her communication number. After the user changes the communication number, the user may typically notify the user's contacts about the change of the communication number through certain ways such as text messages, phone calls, and verbal notices, etc., so that the user's contacts may update the user's communication number in time.

However, a notified party of the number change has to rely on memory, copying or duplicating, etc., to record the user's new communication number after knowing the number change. The notified party may further need to start an address book, finds the user's corresponding contact entry, deletes an old communication number from the contact entry, and enters a new communication number, which makes the entire process cumbersome and inconvenient.

The disclosed methods and systems are directed to solve one or more problems set forth above and other problems.

BRIEF SUMMARY OF THE DISCLOSURE

The present invention is directed to solving the complicated and cumbersome operation problems occurred during the communication number update of the address book in current technologies.

One aspect of the present invention includes a communication number updating method. The method includes obtaining an old communication number and a new communication number used by a same user account of an instant messenger for a user of the old communication number and the new communication number, generating a communication number change message which carries the old communication number and the new communication number, sending the communication number change message to a contact of the user account through the instant messenger, so that the instant messenger logged in by the contact of the user account automatically accesses a local address book and add the new communication number in a communication entry of the old communication number in the local address book.

Another aspect of the present invention includes another communication number updating method. The method includes receiving a communication number change message sent by a contact of a user account currently logging in an instant messenger for a user, wherein the communication number change message carries an old communication number and a new communication number used by the contact of the user account; accessing a local address book by the instant messenger to find a communication entry of the old communication number in the local address book; and automatically adding the new communication number in the communication entry of the old communication number in the local address book.

Another aspect of the present invention includes a communication number updating apparatus. The communication number updating apparatus includes an obtaining unit, a generating unit, and a sending unit. The obtaining unit is configured to obtain an old communication number and a new communication number used by a same user account of an instant messenger for a user of the old communication number and the new communication number. The generating unit is configured to generate a communication number change message, and the communication number change message carries the old communication number and the new communication number. Further, the sending unit is configured to send the communication number change message to a contact of the user account through the instant messenger, so that the instant messenger logged in by the contact of the user account automatically accesses a local address book and adds the new communication number in a communication entry of the old communication number in the local address book.

Another aspect of the present invention includes another communication number updating apparatus. The communication number updating apparatus includes a receiving unit, a finding unit, and a modifying unit. The receiving unit is configured to receive a communication number change message sent by a contact of a user account currently logging in an instant messenger for a user. The communication number change message carries an old communication number and a new communication number of the contact of the user account. The finding unit is configured to access a local address book by the instant messenger to find a communication entry of the old communication number in the local address book. Further, the modifying unit configured to automatically add the new communication number in the communication entry of the old communication number in the local address book.

Other aspects of the present disclosure can be understood by those skilled in the art in light of the description, the claims, and the drawings of the present disclosure.

DETAILED DESCRIPTION

In order to make the purposes, technical solutions and advantages of the present invention to be more clearly understood, the followings, together with accompanying drawings, describe in detail the present invention with embodiments. It should be understood that the embodiments described herein are merely to illustrate the present invention and are not intended to limit the present invention.

According the disclosed embodiments of the present invention, when a user changes his/her communication number, the user notifies the change of the communication number based on an instant messenger (IM) relationship network of the user. Meanwhile, a notified party accesses an address book of the instant messenger with an authorized privilege and updates automatically the user's communication number. Thus, the communication number updating process can be simplified, improving the efficiency of communication number updating operation.

Figure 1:
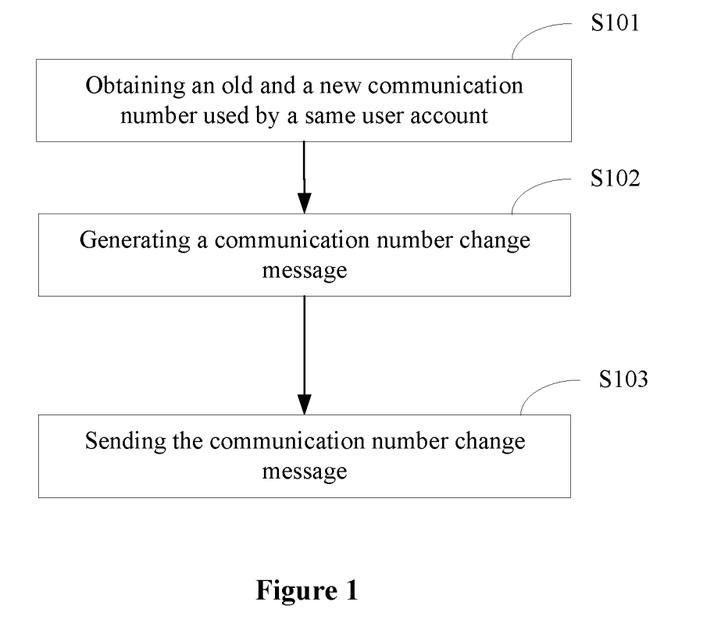
FIG. 1 illustrates a flow chart of a communication number updating method implemented on a sending party of according to disclosed embodiments of the present invention.
Figure 5:
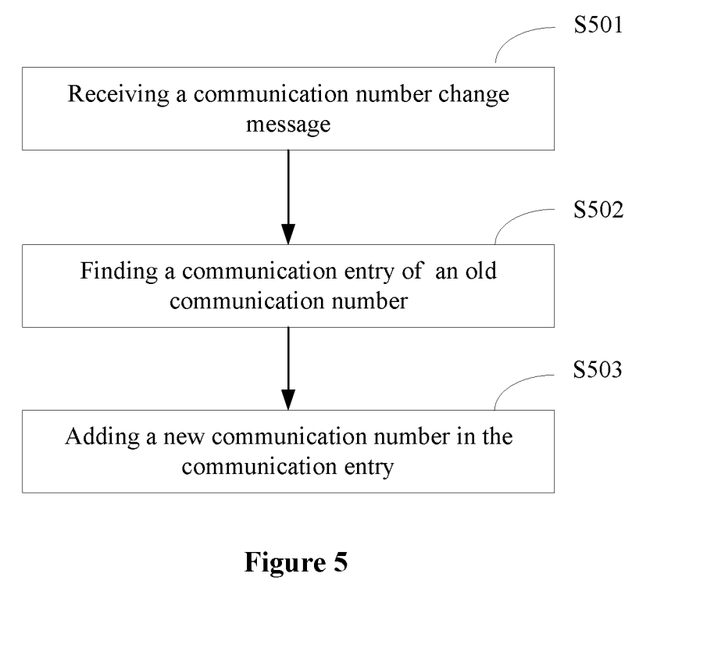
FIG. 5 illustrates a flow chart of a communication number updating method implemented on a notified party according to disclosed embodiments of the present invention.

FIG. 1 illustrates a flow chart of a communication number updating method implemented on a sending party of according to disclosed embodiments of the present invention. And FIG. 5 illustrates a flow chart of a communication number updating method implemented on a notified or receiving party according to disclosed embodiments of the present invention. Both methods can be implemented, for example, in an exemplary environment 1000 as shown in FIG. 10.

Figure 10:
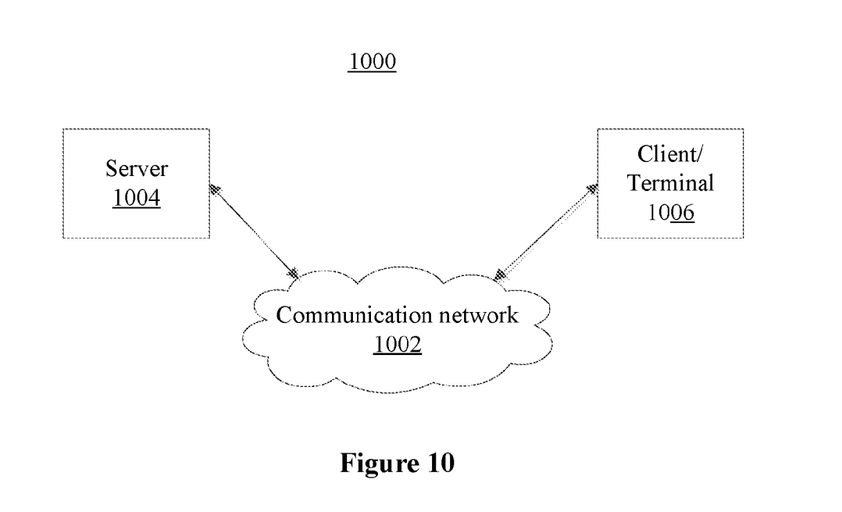
FIG. 10 illustrates an exemplary environment incorporating certain disclosed embodiments.

FIG. 10 illustrates an exemplary environment 1000 incorporating certain disclosed embodiments. As shown in FIG. 10, environment 1000 can include a server 1004, a client (or a terminal) 1006, and a communication network 1002.

The server 1004 and the client 1006 may be coupled through the communication network 1002 for information exchange, such as webpage browsing, Internet searching, data downloading, etc. Although only one client 1006 and one server 1004 is shown in the environment 1000, any number of clients 1006 or servers 1004 may be included, and other devices may also be included.

Communication network 1002 may include any appropriate type of communication network for providing network connections to the server 1004 and client 1006 or among multiple servers 1004 or clients 1006. For example, communication network 1002 may include the Internet or other types of computer networks or telecommunication networks, either wired or wireless.

A client, as used herein, may refer to any appropriate user terminal with certain computing capabilities, such as a personal computer (PC), a workstation computer, a server computer, a hand-held computing device (tablet), a smart phone or mobile phone, or any other user-side computing device. In certain situations, a client may also refer to an application program installed and running on the client terminal.

A server, as used herein, may refer to one or more server computers configured to provide certain server functionalities, such as database management and search engines. A server may also include one or more processors to execute computer programs in parallel.

Figure 9:
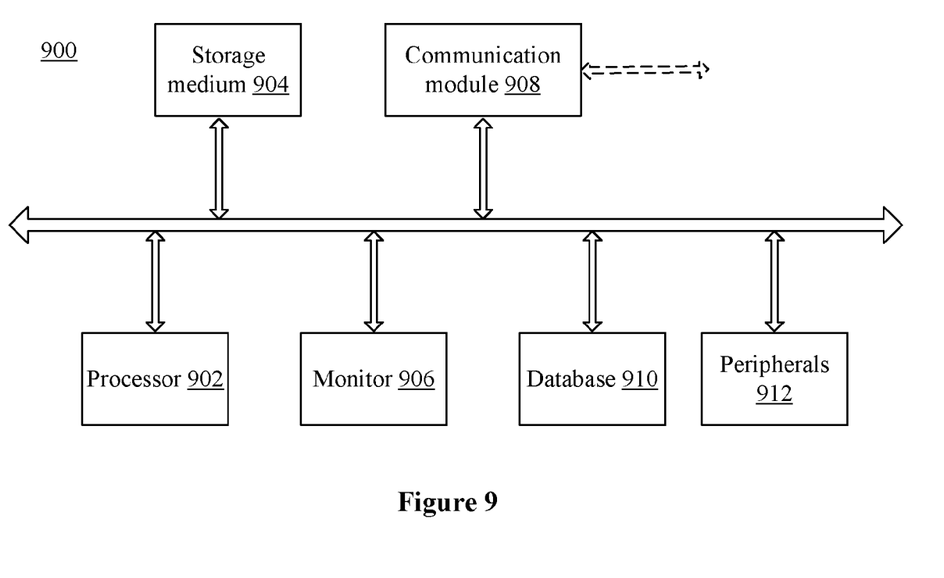
FIG. 9 illustrates a block diagram of an exemplary computing platform for communication number update according to disclosed embodiments of the present invention.

The server 1004 and the client/terminal 1006 may be implemented on any appropriate computing platform. FIG. 9 shows a block diagram of an exemplary computing platform 900 for communication number update according to disclosed embodiments of the present invention.

As shown in FIG. 9, the computing platform 900 may include a processor 902, a storage medium 904, a monitor 906, a communication module 908, a database 910, and peripherals 912. Certain devices may be omitted and other devices may be included.

Processor 902 may include any appropriate processor or processors. Further, processor 902 can include multiple cores for multi-thread or parallel processing. Storage medium 904 may include memory modules, such as ROM, RAM, flash memory modules, and erasable and rewritable memory, and mass storages, such as CD-ROM, U-disk, and hard disk, etc. Storage medium 904 may store computer programs for implementing various processes, when executed by processor 902.

Further, peripherals 912 may include I/O devices such as keyboard and mouse, and communication module 908 may include network devices for establishing connections through the communication network. Database 910 may include one or more databases for storing certain data and for performing certain operations on the stored data, such as database searching.

In operation, the computing platform 900 may perform the communication number change update when required by a user. The computing platform 900 may work as a sending party to initiate the update of the communication number in the communication number updating method illustrated in FIG. 1. The computing platform 900 may also work as a notified party to apply the update of the communication number in the method illustrated in FIG. 5.

The computing platform 900 may also work as a server to perform corresponding operations to update the communication number.

FIG. 1 illustrates a flow chart of a communication number updating method implemented on a sending party according to disclosed embodiments of the present invention. In the disclosed embodiments, the sending party refers to a sending party of a communication number change notification. As shown in FIG. 1, the communication number updating method includes the following steps.

S101, an old communication number and a new communication number of a same user account on an instant messenger are obtained. The instant messenger (IM in short) refers to a communication tool with the capability to send and receive instant messages through Internet, it can be installed and run on a communication terminal with network access capability, such as a cell phone, a tablet computer and a desktop computer, etc. The instant messenger at runtime corresponds to a user account currently logged in the instant messenger. Each user account on the instant messenger has its own relationship chain. Based on the relationship chain, the user account performs instant communicating with its contacts through the Internet.

Because the user account on the instant messenger corresponds to a user, the user may also use a mobile communication service provided by a telecommunication service provider while using an instant messaging service of the instant messenger. The telecommunication service provider assigns each user a subscriber identity module card (SIM), which corresponds to a communication number, such as a phone number, an IMEI number, etc. Here the communication number described in S101 may include the communication number assigned to the user by the telecommunication service provider. The old communication number may include the corresponding communication number of the SIM card which was used by the user before the user changes the SIM card, and the new communication number may include the corresponding communication number of the SIM card currently used by the user.

According to disclosed embodiments, the old communication number and the new communication number are obtained when the user account logs in the instant messenger. In one embodiment, when the user account logs in the instant messenger, the old communication number and the new communication number entered by the user are detected.

Specifically, when a communication number change notification is triggered on the instant messenger, the instant messenger pops up an indication message to instruct the user to enter the old communication number and the new communication number. The instant messenger detects content entered by the user in the corresponding dialog box to obtain the old communication number and the new communication number used by the user account currently logging in the instant messenger.

Figure 2:
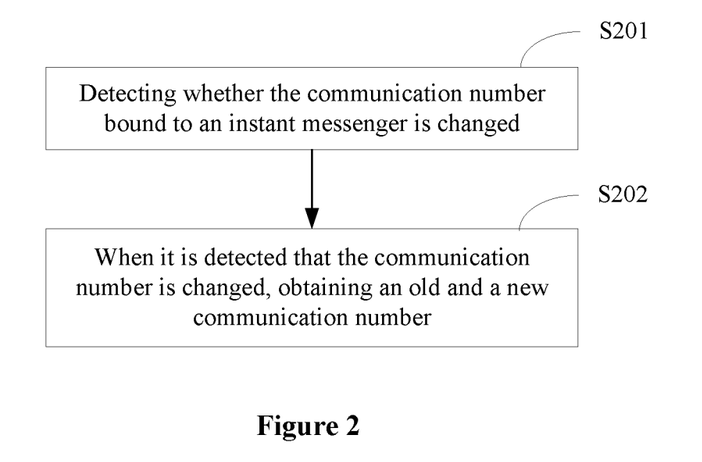
FIG. 2 illustrates a flow chart of obtaining an old and a new communication number of a same user account of an instant messenger according to disclosed embodiments of the present invention.

Further, with the development of mobile Internet, the instant messenger is also expanding toward mobility. More often, the relationship chain of the instant messenger may overlap with an address book associated with the communication number. Therefore, the instant messenger begins to bind the user account with the communication number. When the communication number used by the user account is changed, generally, the user account may also make a corresponding change on the communication number bound to the instant messenger. So according to one embodiment, as shown in FIG. 2, S101 may further include the following steps.

S201, it is detected whether the communication number of the user account bound to the instant messenger is changed.

S202, when it is detected that the communication number of the user account bound to the instant messenger is changed, the changed communication number is obtained as the new communication number and the communication number before the change is obtained as the old communication number.

When the communication number of the user account bound to the instant messenger is changed, the instant messenger may detect in real time that the communication number bound to the user account is changed. For example, the instant messenger client side program may detect any change of the communication number based on the SIM information. When it is detected that the communication number of the user account bound to the instant messenger is changed, the instant messenger automatically obtains the changed communication number as the new communication number of the user account and obtains the communication number before the change as the old communication number of the user account.

Comparing the above two approaches, the former approach may better reflect the user's real intention to send the communication number change notification than the latter approach. For example, when the user just adds an extra communication number, while is still using the existing communication number, the user may not intend to change the communication number bound to the instant messenger. In this case, the latter approach may be unable to trigger the communication number change notification.

However, comparing to the former approach, the latter approach may better accelerate the operation efficiency of the communication number change notification. The latter approach does not need the user to enter the communication numbers, instead the latter embodiment detects and automatically obtains the new communication number and the old communication number through the instant messenger, thus avoids the situation where a wrong communication number is obtained due to user input errors.

Meanwhile, both approaches may be combined with each other. For example, after the former approach detects the new communication number and the old communication number entered by the user, the instant messenger may also detect an SIM card of a current communication terminal to determine whether the new communication number entered by the user is correct. When it is detected that the new communication number entered by the user does not match the corresponding communication number of the SIM card, the instant messenger may give a "wrong number entered" indication, so the user may further confirm the number change to ensure a correct communication number being entered.

S102, a communication number change message is generated, and the communication number change message carries the old communication number and the new communication number.

According to the disclosed embodiments, the generated communication number change message carries the old communication number and the new communication number obtained in S101. When the generated communication number change message is sent through the network and is forwarded to another instant messenger client via an instant messenger server, the communication number change message may take the information format of "message header+message body", where the message header, besides carrying the old communication number and the new communication number obtained in S101, also carries an user account ID of a contact as a notified party, so the instant messenger server may be able to accurately send the communication number change message to a specified contact. Further, the message body may carry a text explanation of the communication number change to be displayed in an instant message sent to the notified party, so the notified party may better understand the intention of the communication number change message. The text explanation carried in the message body may be generated automatically by the instant messenger in the background, or the text message may also be generated based on the user's personalized input.

S103, the communication number change message is sent to a contact of the user account through the instant messenger, so the instant messenger logged in by the contact of the user account may accessing a local address book to add the new communication number to a communication entry of the old communication number in the local address book.

Thus, after the communication number change message is generated in S102, in S103, the communication number change message is sent through an information transmission function of the instant messenger to the contact of the user account via an instant messaging server. So that after the instant messenger logged in by the contact of the user account receives the communication number change message, i.e., a notified party, the instant messenger may access the local address book and adds the new communication number used by the user account to the communication entry of the old communication number in the local address book. After a notified party receives the communication number change message, the notified party may modify the address book in the ways described subsequently.

Figure 3:
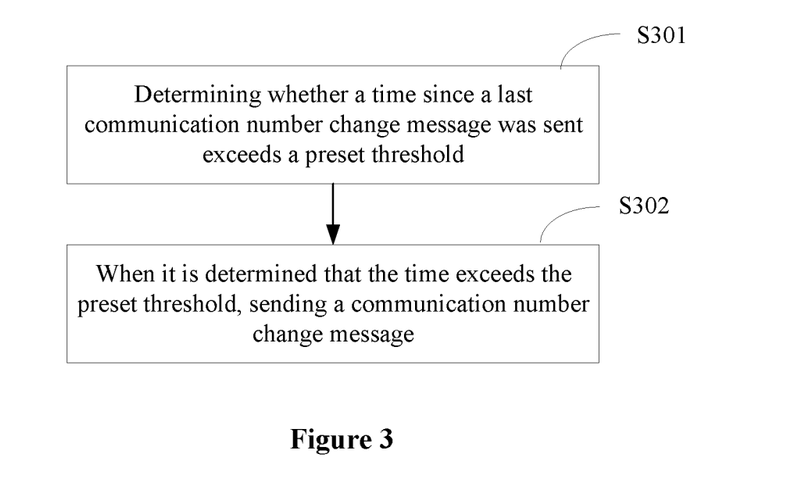
FIG. 3 illustrates a flow chart of sending a communication change notification through an instant messenger according to disclosed embodiments of the present invention.

In order to avoid frequently sending the communication number change message to the contact incurred by user mistakes or malicious user actions, an appropriate security policy may be established to ensure the authenticity of the communication number change message. As shown in FIG. 3, S103 further includes the following steps.

S301, it is determined whether a time since a last communication number change message was sent to the contact of the user account exceeds a preset threshold.

S302, when the time since the last communication number change message was sent to the contact of the user account exceeds the preset threshold, the communication number change message is sent to the contact of the user account through the instant messenger.

Thus, by setting the preset threshold, a sending frequency of the communication number change message of a same user account on the instant messenger can be restricted. For example, the preset threshold may be set as one month. After the instant messenger triggers the sending of the communication number change message, it needs to determine whether the time since the last communication number change message of the user account was sent exceeds one month. If the answer is yes, the process proceeds to send the communication number change message. Otherwise, the process ends the operation.

The disclosed embodiments of the present invention shown in FIG. 3 may prevent sending frequently and maliciously the communication number change notification to harass other users. For example, when the user account is stolen, a criminal may use the user account to send a false communication number change notification to the contact of the user account, causing security vulnerabilities in the user's life. And the disclosed embodiments shown in FIG. 3 may prevent such scenarios.

Figure 4:
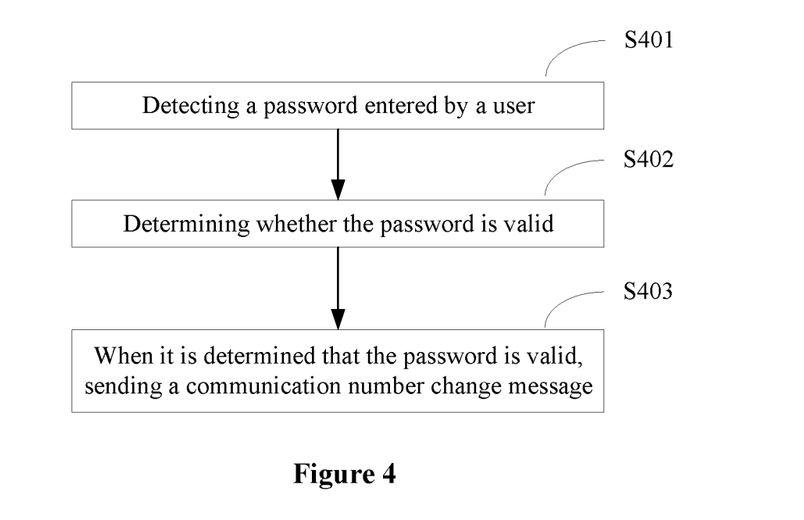
FIG. 4 illustrates a flow chart of another sending a communication change notification through an instant messenger according to disclosed embodiments of the present invention.

According to another embodiment of the present invention, S103 may further include the following steps as shown in FIG. 4.

S401, a password entered by the user is detected.

S402, it is determined whether the password entered by the user is valid.

S403, when it is determined that the password entered by the user is valid, the communication number change message is sent to the contact of the user account through the instant messenger.

According to the disclosed embodiments of the present invention, before sending the communication number change message, the password entered by the user is detected to authenticate the legitimacy of the user's identity and to ensure that the communication number change message is sent based on the user's true intention. Wherein, the password may be a login password of the user account on the instant messenger. Furthermore, in order to ensure the security of the password, the password may further be a different password from the login password. And only after it is determined that the password entered by the user is a valid password for sending the communication number change message, the process proceeds to send the communication number change message. Otherwise the process ends operation.

It should be noted that the disclosed embodiments shown in FIG. 3 and FIG. 4 may be implemented on an instant messenger client, and may also be implemented on an instant messenger server. Meanwhile, receiving parties to whom the communication number change message is sent may be configured in advance, and the receiving parties may include the entire or part of the contacts of the user account.

Thus, according to the disclosed embodiments of the present invention, when the user's communication number is changed, the user may notify the change of the communication number based on the relationship chain or the relationship network on the user's instant messenger. On one hand, the user may take advantage of the convenient LIST-SERV function of the instant messenger to send the communication number change message to a group of people. On the other hand, after the notified party receives the communication number change message, the instant messenger of the notified party with its authorized access to the address book may automatically update the user's communication number in the address book. Thus, the communication number update operation can be greatly simplified and the communication number updating efficiency is improved.

FIG. 5 illustrates a flow chart of a communication number updating method implemented on a notified party according to disclosed embodiments of the present invention. The process is performed by a receiver of a communication number change notification, which is the notified party. As shown in FIG. 5, the communication number updating method includes the following steps.

S501, a communication number change message sent by a contact of a user account currently logging in an instant messenger is received, wherein the communication number change message carries an old communication number and a new communication number used by the contact of the user account.

According to the disclosed embodiments, after the notified party of the communication number change message logs in with the user account on the instant messenger, the notified party receives the communication number change message sent by the contact of the user account (i.e., the notified party's account), and the contact is a sending party of the communication number change message. Wherein, the received communication number change message carries the old communication number and the new communication number used by the contact.

According to the disclosed embodiments, after receiving the communication number change message, the old communication number and the new communication number used by the contact may be extracted from the communication number change message according to a pre-agreed format.

As described above, the communication number change message may be transmitted in the network in the message format: "message header+message body". After the communication number change message is received, the new communication number and the old communication number used by the contact are extracted from the message header and a descriptive text to be displayed on the instant messenger is extracted from the message body.

S502, a local address book is accessed by the instant messenger to find a communication entry of the old communication number.

More specifically, based on the new communication number and the old communication number carried in the communication number change message, the instant messenger accesses the address book stored in a SIM card or in a memory of a communication terminal of the instant messenger to find the communication entry of the old communication number.

S503, the new communication number is added to the communication entry of the old communication number in the address book.

According to the disclosed embodiments, after the communication entry of the old communication number is found, the communication entry may be modified accordingly. In the case that the old communication number is no longer in-service, in S503, the old communication number can be deleted directly from the communication entry and the new communication number can be added to the communication entry to update the communication number of the contact. In some embodiments, if the old communication number is not found in the address book, the new communication number is added as a new communication entry without the need to delete the old communication number.

When keeping an original old communication number and adding a communication number, the old communication number is kept in the communication entry, not deleted from the communication entry, and the new communication number is added in the communication entry. Specifically, the sending party of the communication number change message may attach a corresponding appropriate descriptive text in the message body, and the descriptive text can be displayed in an instant message of the notified party. So that the notified party may understand the true intention of the sending party and make an appropriate change to the communication entry.

For example, when the old communication number of the contact is no longer in-service, the descriptive text may include a relevant information such as "effect immediately, the original communication number is no longer in service". And when the contact keeps the old communication number and adds another communication number, the descriptive text may include the relevant information such as "the original communication number continues to be in service".

Figure 6:
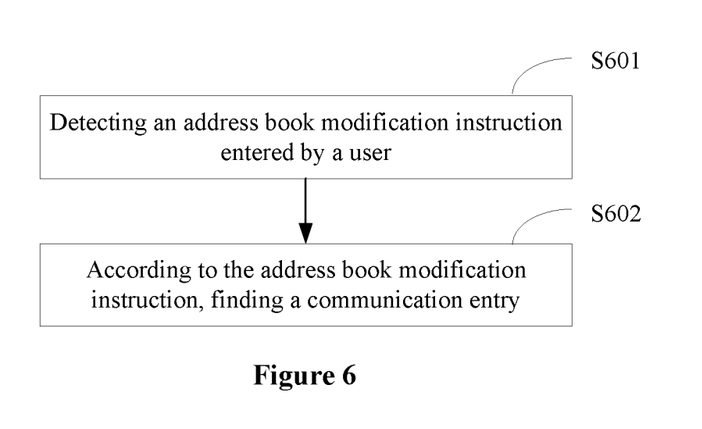
FIG. 6 illustrates a flow chart of finding a corresponding communication entry of an old communication number in a local address book according to disclosed embodiments of the present invention.

In order to avoid the frequent sending of the communication number change message to the notified party due to user mistakes or malicious actions, an appropriate security policy may be established to ensure that the local address book may not be maliciously modified. As shown in FIG. 6, according to another embodiment of the present invention, S502 further includes the following steps.

S601, an instruction entered by the user to modify the address book is detected.

S1002, according to the instruction entered by the user to modify the address book, the instant messenger accesses the local address book to find the communication entry of the old communication number.

In the disclosed embodiments, the instant messenger needs to obtain the address book modification instruction from the user to be able to access the local address book and to modify he communication entry. Thus, the situation where the local address book is modified without the knowledge of the user can be avoided, and the other situation where the local address book is modified by the maliciously sent communication number change message can also be avoided. So that the data security of the notified party can be ensured.

Thus, according to the disclosed embodiments of the present invention, when the user's communication number is changed, the user may notify the change of the communication number based on the relationship network on the user's instant messenger. Meanwhile, according to the authorized access to the address book by the instant messenger of the notified party, the notified party may automatically update the user's communication number in the address book. Thus, the communication number update operation can be greatly simplified and the communication number update efficiency is improved.

Figure 11:
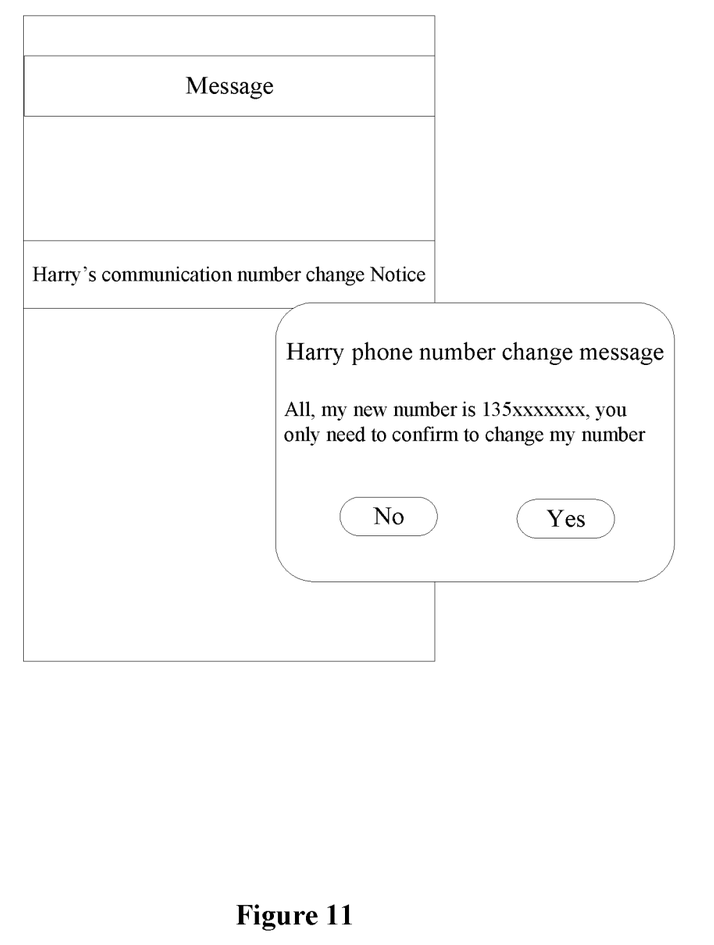
FIG. 11 illustrates an exemplary communication number change on a mobile terminal consistent with the disclosed embodiments.

FIG. 11 illustrates an exemplary communication number change on a mobile terminal consistent with the disclosed embodiments. As shown in FIG. 11, a message is received from a contact of the notified party with the descriptive texts "Harry's communication number change notice". The user may click on the message, and a pop-up dialogue window is displayed to display the entire message and to ask the user to confirm whether to accept the number change (e.g., the phone number change).

When the user clicks on the "Yes" button (i.e., confirmed), the local address book is accessed (e.g., with the user's authorization), and the new communication number is updated in the local address book, as described above. On the other hand, when the user clicks on the "No" button, the new communication number is not updated in the local address book.

Figure 7:
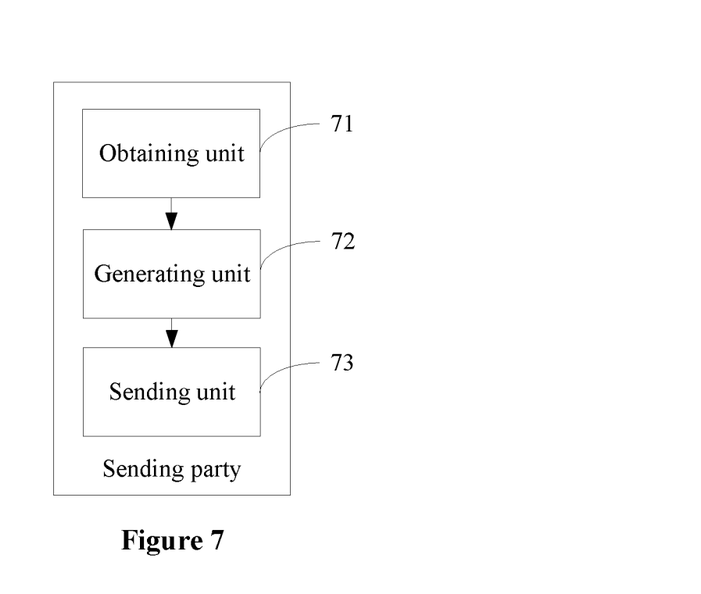
FIG. 7 illustrates a block diagram of a communication number updating apparatus according to disclosed embodiments of the present invention.

FIG. 7 illustrates a block diagram of a communication number updating apparatus according to disclosed embodiments of the present invention for a communication terminal with an instant messenger, wherein the communication terminal as a sending party implements the communication number updating method shown in FIG. 1-4. As shown in FIG. 7, the apparatus includes an obtaining unit 71, a generating unit 72 and a sending unit 73.

In FIG. 7, the sending party and the various units described in relation to the Figure refer to one or more computer programs that are stored in storage medium 904 (see FIG. 9), such as a memory. When executed by a processor 902 (see FIG. 9) the computer programs for the sending party and the various units may implement the various functions as described in FIGS. 1-4.

The obtaining unit 71 is configured to obtain an old and a new communication number used by a same user account of an instant messenger. The generating unit 72 is configured to generate a communication number change message, and the communication number change message carries the old communication number and the new communication number.

The sending unit 73 is configured to send the communication number change message to a contact of the user account through the instant messenger, so the contact of the user account may log in the instant messenger to access a local address book and add the new communication number in a communication entry of the old communication number in the local address book.

In addition, the obtaining unit 71 may also be configured to detect the old communication number and the new communication number entered by the user when the user account logs in the instant messenger. Further, the obtaining unit 71 may include a detecting subunit and an obtaining subunit (not shown).

The detecting subunit is configured to detect whether the communication number bound to the instant messenger is changed. The obtaining subunit is configured to obtain the communication number after the change as the new communication number and to obtain the communication number before the change as the old communication number when it is detected that the communication number bound to the instant messenger is changed.

Further, the sending unit 73 may also include a first determining subunit and a first sending subunit (not shown). The first determining subunit is configured to determine whether the time since a last communication number change message was sent to the contact of the user account exceeds a preset threshold. The first sending subunit is configured to send the communication number change message to the contact of the user account through the instant messenger when the time since the last communication number change message was sent to the contact of the user account exceeds the preset threshold.

Furthermore, the sending unit 73 may further include a password detecting subunit, a second determining subbing and a second sending subunit (not shown). The password detecting subunit is configured to detect a password entered by the user. The second determining subunit is configured to determine whether the password entered by the user is valid. The second sending subunit is configured to send the communication number change message to the contact of the user account when it is determined that the password entered by the user is valid.

Figure 8:
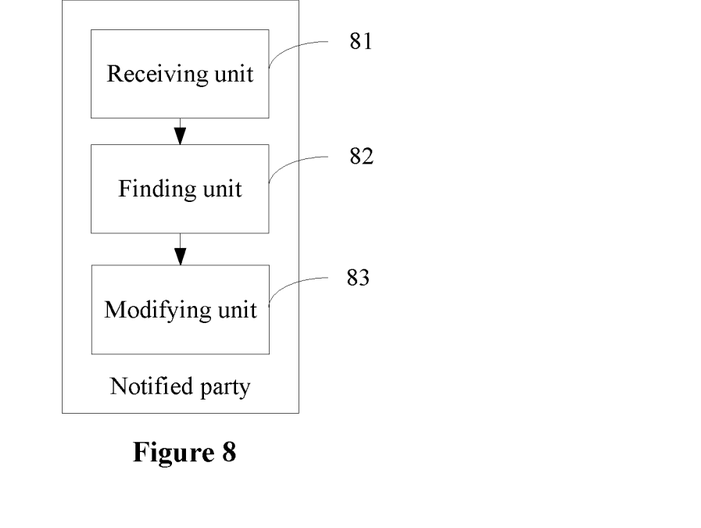
FIG. 8 illustrates a block diagram of another communication number updating apparatus according to disclosed embodiments of the present invention.

FIG. 8 illustrates a block diagram of a communication number updating apparatus according to disclosed embodiments of the present invention for a communication terminal with an instant messenger, wherein the communication terminal as a notified party implements the communication number updating method shown in FIG. 5-6. As shown in FIG. 8, the apparatus includes a receiving unit 81, a finding unit 82 and a modifying unit 83.

In FIG. 8, the notified party and the various units described in relation to the Figure refer to one or more computer programs that are stored in storage medium 904 (see FIG. 9), such as a memory. When executed by a processor 902 (see FIG. 9) the computer programs for the notified party and the various units may implement the function as described in FIGS. 5-6.

The receiving unit 81 is configured to receive a communication number change message sent by a contact of a user account through a currently logged in instant messenger, the communication number change message carries an old communication number and a new communication number used by the contact of the user account. The finding unit 82 is configured to find a communication entry of the old communication number in a local address book by accessing the local address book through the instant messenger.

The modifying unit 83 is configured to add the new communication number in the communication entry of the old communication number in the local address book. In addition, the modifying unit 83 may be further configured to replace the old communication number with the new communication number in the communication entry of the old communication number in the local address book.

Further, the finding unit 82 may include an instruction detecting subunit and a finding subunit (not shown). The instruction detecting subunit is configured to detect an address book modification instruction entered by the user. The finding subunit is configured to find the communication entry of the old communication number through the access of the instant messenger to the local address book based on the address book modification instruction entered by the user.

According to the disclosed embodiments of the present invention, when the user's communication number is changed, the user may notify the communication number change based on the relationship network on the user's instant messenger. Meanwhile, based on the authorized access to the address book by the instant messenger of the notified party, the notified party may automatically update the user's communication number in the address book. Thus, the communication number update operation can be greatly simplified and the communication number update efficiency is improved.

According to the disclosed embodiments of the present invention, when the communication number associated with a terminal client is changed, a related contact list from a server is obtained and the communication number change message is sent to the contacts by the server. Thus, the user no longer needs to inform each contact through the communication terminal, which eliminates the resulting communication cost.

The above describes certain embodiments of the present invention, but the scope of the present invention is not limited thereto, and those skilled in the art may easily think of variations, changes, modifications or replacements of the present invention within the disclosed technical scope. Any of those variations, changes, modifications or replacements should fall within the protection scope of the present invention. Accordingly, the scope of the present invention should be the scope of the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

According to the disclosed embodiments of the present invention, when the user's communication number is changed, the user may notify the communication number change based on the relationship network on the user's instant messenger. Meanwhile, based on the authorized access to the address book by the instant messenger of the notified party, the notified party may automatically update the user's communication number in the address book. Thus, the communication number update operation can be greatly simplified and the communication number update efficiency is improved.

What is claimed is:

1. A communication number updating method, comprising:

obtaining an old communication number and a new communication number used by a same user account of an instant messenger for a user of the old communication number and the new communication number;

generating a communication number change message, wherein the communication number change message carries the old communication number and the new communication number; and sending the communication number change message to a contact of the user account through the instant messenger, so that the instant messenger logged in by the contact of the user account automatically accesses a local address book and add the new communication number in a communication entry of the old communication number in the local address book.

2. The method according to claim 1, wherein obtaining the old communication number and the new communication number of the same user account of the instant messenger further includes:
when the user account logs in the instant messenger, detecting the old communication number and the new communication number entered by the user.

3. The method according to claim 1, wherein obtaining the old communication number and the new communication number of the same user account of the instant messenger further includes:
detecting whether the communication number bound to the instant messenger is changed; and
when it is detected that the communication number bound to the instant messenger is changed, obtaining the communication number before the change as the old communication number and obtaining the communication number after the change as the new communication number.

4. The method according to claim 1, wherein sending the communication number change message to the contact of the user account through the instant messenger includes:
determining whether a time period since a last communication number change message was sent to the contact of the user account exceeds a preset threshold; and
when it is determined that the time period since the last communication number change message was sent to the contact of the user account exceeds the preset threshold, sending the communication number change message to the contact of the user account through the instant messenger.

5. The method according to claim 1, wherein sending the communication number change message to the contact of the user account through the instant messenger further includes:
detecting a password entered by the user;
determining whether the password entered by the user is valid; and
when it is determined that the password entered by the user is valid, sending the communication number change message to the contact of the user account through the instant messenger.

6. A communication number updating method, comprising:
receiving a communication number change message sent by a contact of a user account currently logging in an instant messenger for a user, wherein the communication number change message carries an old communication number and a new communication number used by the contact of the user account;
accessing a local address book by the instant messenger to find a communication entry of the old communication number in the local address book; and
automatically adding the new communication number in the communication entry of the old communication number in the local address book.

7. The method according to claim 6, wherein adding the new communication number in the communication entry of the old communication number in the local address book includes:
replacing the old communication number with the new communication number in the communication entry of the old communication number.

8. The method according to claim 6, wherein accessing the local address book by the instant messenger and finding the communication entry of the old communication number in the address book includes:
detecting an address book modification instruction entered by a user; and
according to the address book modification instruction entered by the user, accessing the local address book by the instant messenger and finding the communication entry of the old communication number.

9. A communication number updating terminal including a computer readable media and one or more processors with one or more computer instructions being store on the computer readable media, when executed by the one or more processors, the computer instructions implementing steps to update a communication number, the computer instructions comprising:
an obtaining unit configured to obtain an old communication number and a new communication number used by a same user account of an instant messenger for a user of the old communication number and the new communication number;
a generating unit configured to generate a communication number change message, wherein the communication number change message carries the old communication number and the new communication number; and
a sending unit configured to send the communication number change message to a contact of the user account through the instant messenger, so that the instant messenger logged in by the contact of the user account automatically accesses a local address book and adds the new communication number in a communication entry of the old communication number in the local address book.

10. The terminal according claim 9, wherein, the obtaining unit is further configured to detect the old communication number and the new communication number entered by a user when the user account logs in the instant messenger.

11. The terminal according to claim 9, wherein, the obtaining unit further includes:
a detecting subunit configured to detect whether the communication number of the user account bound to the instant messenger is changed; and
an obtaining subunit configured to obtain the communication number after the change as the new communication number and to obtain the communication number before the change as the old communication number when it is detected that the communication number bound to the instant messenger is changed.

12. The terminal according to claim 9, wherein the sending unit includes
a first determining subunit configured to determine whether a time period since a last communication number change message was sent to the contact of the user account exceeds a preset threshold;
a first sending subunit configured to send the communication number change message to the contact of the user account through the instant messenger when it is determined that the time period since the last communication number change message was sent to the contact of the user account exceeds the preset threshold.

13. The terminal according to claim 9, wherein the sending unit further includes:
a password detecting subunit configured to detect a password entered by the user;
a second determining subunit configured to determine whether the password entered by the user is valid; and
a second sending subunit configured to send the communication number change message to the contact of the user account through the instant messenger when it is determined that the password entered by the user is valid.

14. A communication number updating terminal including a computer readable media and one or more processors with one or more computer instructions being store on the computer readable media, when executed by the one or more processors, the computer instructions implementing steps to update a communication number, the computer instructions comprising:
- a receiving unit configured to receive a communication number change message sent by a contact of a user account currently logging in an instant messenger for a user, wherein the communication number change message carries an old communication number and a new communication number of the contact of the user account;
- a finding unit configured to access a local address book by the instant messenger to find a communication entry of the old communication number in the local address book; and
- a modifying unit configured to automatically add the new communication number in the communication entry of the old communication number in the local address book.

15. The terminal according to claim 14, wherein, the modifying unit is further configured to replace the old communication number with the new communication number in the communication entry of the old communication number in the local address book.

16. The terminal according to claim 14, wherein the finding unit further includes:
- an instruction detecting subunit configured to detect an address book modification instruction entered by the user; and
- a finding subunit configured to access the local address book by the instant messenger to find the communication entry of the old communication number in the local address book based on the address book modification instruction entered by the user.

* * * * *